United States Patent [19]
Simon

[11] Patent Number: 5,570,354
[45] Date of Patent: Oct. 29, 1996

[54] DEVICE FOR INCREASING THE FUNCTIONAL AREA OF A SYSTEM OF DIGITALLY OPERATING CORDLESS TELEPHONES

[75] Inventor: Rainer Simon, Bellach, Switzerland

[73] Assignee: ASCOM Business Systems AG, Bellach, Switzerland

[21] Appl. No.: 490,785

[22] Filed: Jun. 15, 1995

[30] Foreign Application Priority Data

Jun. 16, 1994 [CH] Switzerland ............................ 01898/94

[51] Int. Cl.$^6$ ........................................................ H04B 7/155
[52] U.S. Cl. ................................. 370/26; 370/29; 370/61; 370/97; 455/18; 455/54.1
[58] Field of Search ........................................ 455/7, 15, 17, 455/18, 19, 53.1, 54.1; 370/26, 29, 30, 50, 55, 61, 75, 94.1, 95.3, 97, 85.13

[56] References Cited

U.S. PATENT DOCUMENTS

| | | | |
|---|---|---|---|
| 3,513,397 | 5/1970 | Shimada ..................................... | 455/19 |
| 4,135,156 | 1/1979 | Sanders, Jr. et al. ...................... | 455/18 |
| 5,377,184 | 12/1994 | Beal et al. ................................. | 370/26 |
| 5,388,101 | 2/1995 | Dinkins ..................................... | 370/97 |
| 5,463,671 | 10/1995 | Marsh et al. .............................. | 370/50 |

FOREIGN PATENT DOCUMENTS 0399611 5/1990 European Pat. Off. .

*Primary Examiner*—Benedict V. Safourek

[57] ABSTRACT

A system of digitally operating cordless telephone including a fixed station (20) connected with the common net (11) and several freely movable mobile stations (30.1 to 30.4). The naturally provided functional area (22) of the system can be enlarged by using a relay station (40). For this purpose the relay station (40) can permit the retransmission of transmission packages arriving from the fixed station (20) without changes to further mobile stations (30.5, 30.6) in a further functional area (23). In the other direction, the relay station (40) forwards respective packages arriving from the further mobile stations (30.5, 30.6) to the fixed station (20). For this purpose the relay station (40) maintains transmission channels, which are associated with each other in pairs and are chronologically very closely coupled, to the fixed station (20) as well as to the further mobile stations (30.5, 30.6) in accordance with the DECT Standards (Digital European Cordless Telecommunications).

7 Claims, 3 Drawing Sheets

5,570,354

DEVICE FOR INCREASING THE FUNCTIONAL AREA OF A SYSTEM OF DIGITALLY OPERATING CORDLESS TELEPHONES

FIELD OF THE INVENTION

The invention relates to a device for increasing the functional area of a system of digitally operating cordless telephones with a fixed station and with portable mobile stations associated with this fixed station, wherein the fixed stations and the respectively active mobile stations are connected via channels realized by means of time-multiplexing packages and several selectable transmitting frequencies in accordance with DECT Standards. The invention also relates to a method for operating such a device.

BACKGROUND OF THE INVENTION

Systems of digitally operating cordless telephones are known. For example, reference EP-A-0 399 611 describes such a system with a few primary stations connected to the common net and a plurality of mobile secondary stations. In accordance with the DECT Standards (Digital European Cordless Telephone), one duplex channel is respectively available to one primary and one secondary station for digital speech transmission. This duplex channel is allocated, time-multiplexed with eleven other duplex channels, to the respective connection between the said stations on a case to case basis. It is now possible to allocate one or even several free channels to a desired data connection for the transmission of data. This permits a correspondingly more rapid transmission. The stations have lists for the management of the channels which respectively indicate which channels are available for the mentioned purpose of data transmission.

In the field of telecommunications it has also been long known to employ relay stations in transmission arrangements in case where the required range exceeds the capabilities of the primary transmitter and/or the receivers. Such relay station regenerate the signals to be transmitted and transmit the regenerated signals on a respectively further transmission route or to a transmitting area to be supplied by the relay station and extended in respect to the primary area.

The ranges of digital cordless telephones are generally shorter than those of corresponding, analogously operating telephones. This represents a disadvantage of digital cordless telephones which limits their practical use.

OBJECT AND SUMMARY OF THE INVENTION

It is therefore the object of the present invention to correct this disadvantage.

The invention will be described in detail by way of example by means of five drawings figures.

DETAILED DESCRIPTION

Figure 1:
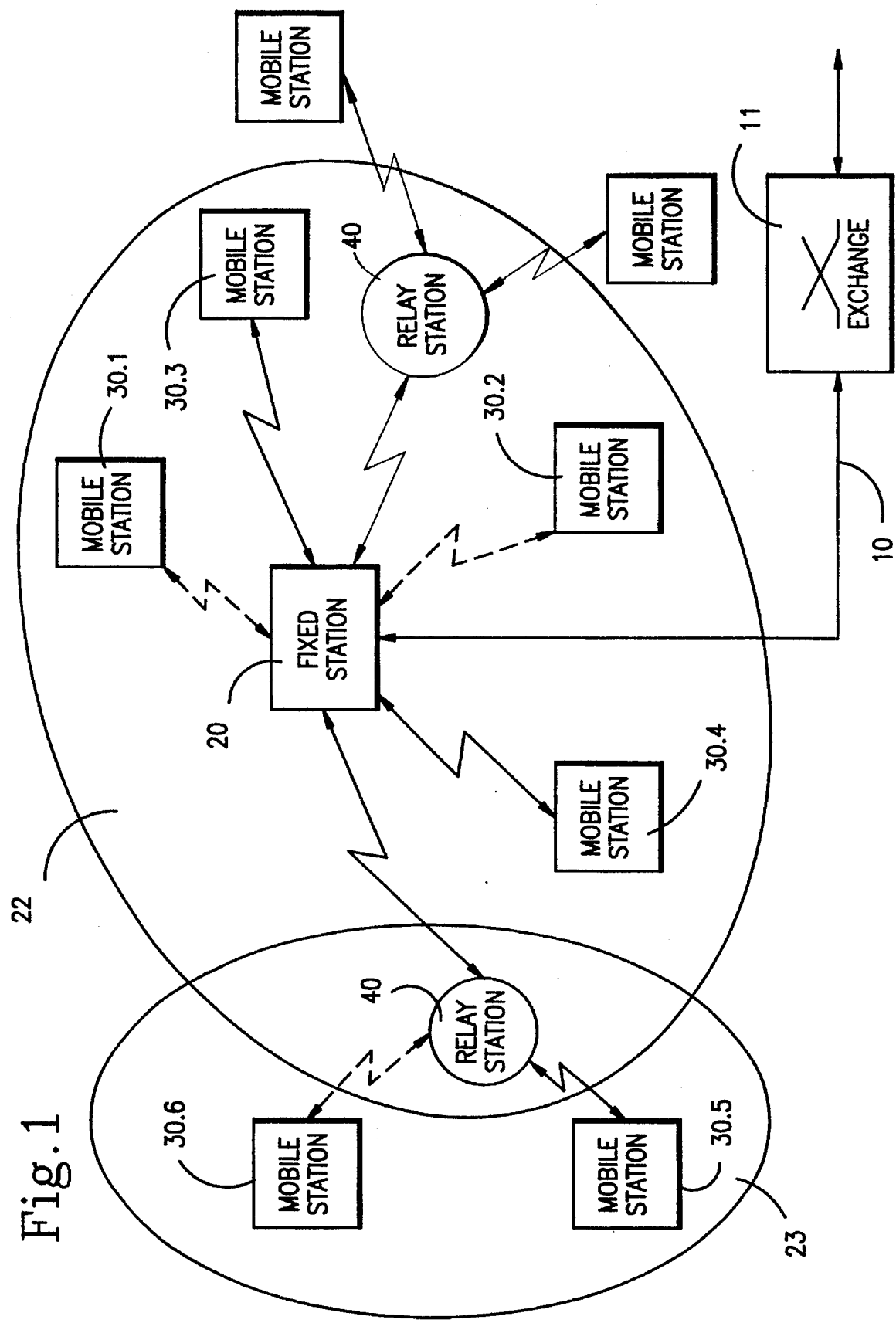
FIG. 1 is a diagram of a system of cordless telephone.

FIG. 1 represents the diagram of a system of cordless telephones. This system comprises, for example, a single fixed or base station 20 which is connected via a telephone line 10 with the general telephone network. This network is represented by an exchange 11. The system furthermore comprises a plurality of portable mobile stations or handsets, for example six mobile stations 30.1 to 30.6. The mobile stations 30.1 to 30.4 and the fixed station 20 are located within a (first) functional area 22, for example a building, within which they can communicate with each other. However, the mobile stations 30.5 and 30.6 are located within a second functional area 23, for example an annex, from where they can communicate only on a limited basis or not at all with the fixed station 20.

A relay station 40 is located at the edge of the first functional area 22. This relay station as well as the mobile stations 30.1 to 30.4 lie, as described, inside the effective range of the fixed station 20 and are connected with it by radio. This is represented by bent two-headed arrows, wherein established voice connections are represented by solid arrows and potential voice connections by dashed arrows.

The mobile stations 30.5, 30.6 are located inside the second functional area 23 and within the range of the relay station 40. They are connected by radio with this station 40. This has also been represented by solid or dashed arrows. Thus the relay station 40 is in simultaneous radio contact with the fixed station 20 as well as the mobile stations 30.5 and 30.6.

Figure 2:
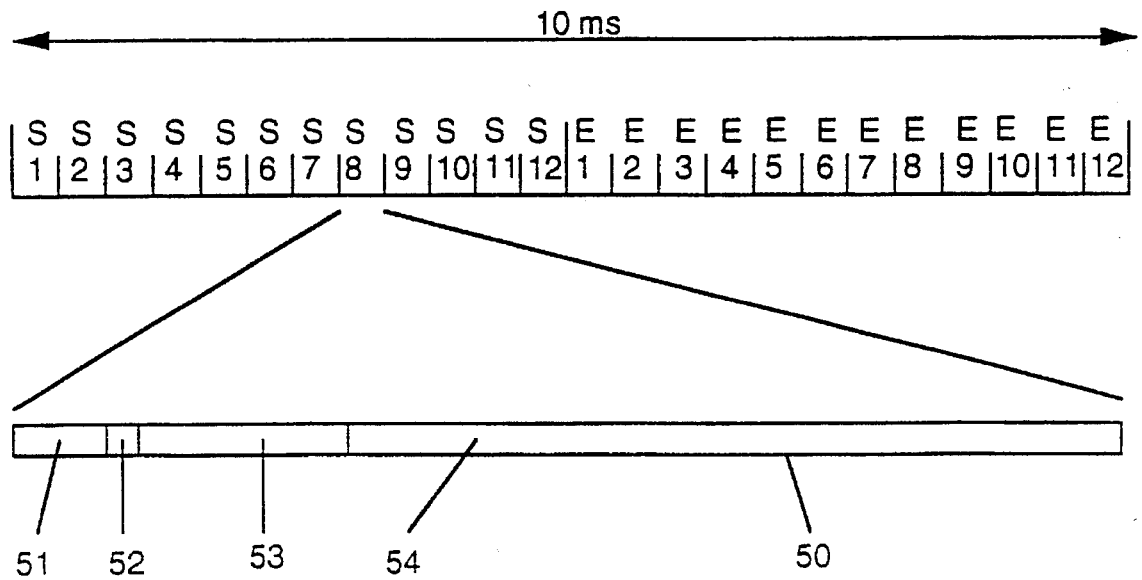
FIG. 2 is a diagram to explain the DECT Standards.

FIG. 2 shows the diagram corresponding to the DECT Standards for the transmission between the stations 20 and 30. Twenty-four time slots follow each other in repetition cycles of 10 milliseconds. The first twelve of these (S1 to S12) are intended for the first transmission direction and the second twelve (E1 to E12) for the other transmission direction. A package 50 is associated with each time slot, which is comprised serially by a synchronizing portion 51, characters 52 to specify the control data, actual control data 53 and the voice data 54 to be transmitted, i.e. the effective data. In this way the DECT method forms a special type of time-multiplex transmission, wherein each package 50 is transmitted on one of ten possible transmission frequencies.

Each connection corresponding to a solid arrow in FIG. 1 occupies two time slots Sn and En, associated in pairs with each other (n=1, 2, 3, . . . 12), wherein one or two transmission frequencies have been selected from the mentioned ten possible frequencies for transmission in the two directions. The combination of the two parameters of time slot pairs and transmission frequency(ies) is called a channel and permits a duplex voice connection. Which of the twelve possible channels is occupied in an individual case and which transmission frequencies are selected depends on the respective situation and is therefore open to a great extent. However, the control data 53 see to it that at no time two mobil stations 30 communicate simultaneously via a common channel with the associated fixed station 20. The dashed arrows of FIG. 1 correspond to potential channels not occupied at the moment.

FIG. 3 again represents the diagram of FIG. 2, but reduced to half size, with two period lengths of 10 milliseconds each and separate for the fixed station 20, the relay station 40 and one of the mobile stations 30.5 or 30.6. The time axis extends from left to right.

Since in principle each time slot can only be used for a single connection, a duplex channel between the fixed station 20 and, for example, the mobile station 30.5 requires a total of two channels of the type described. In this case the first channel is used for the connection between the fixed station 20 and the relay station 40, the second channel for the connection between the relay station 40 and the mobile station 30.5. In the process the two time slots of each transmission direction as well as the transmission directions themselves must be in the correct chronological sequence. This requirement makes the distribution of the said time slots or the two channels to respectively two period lengths necessary.

Figure 3:
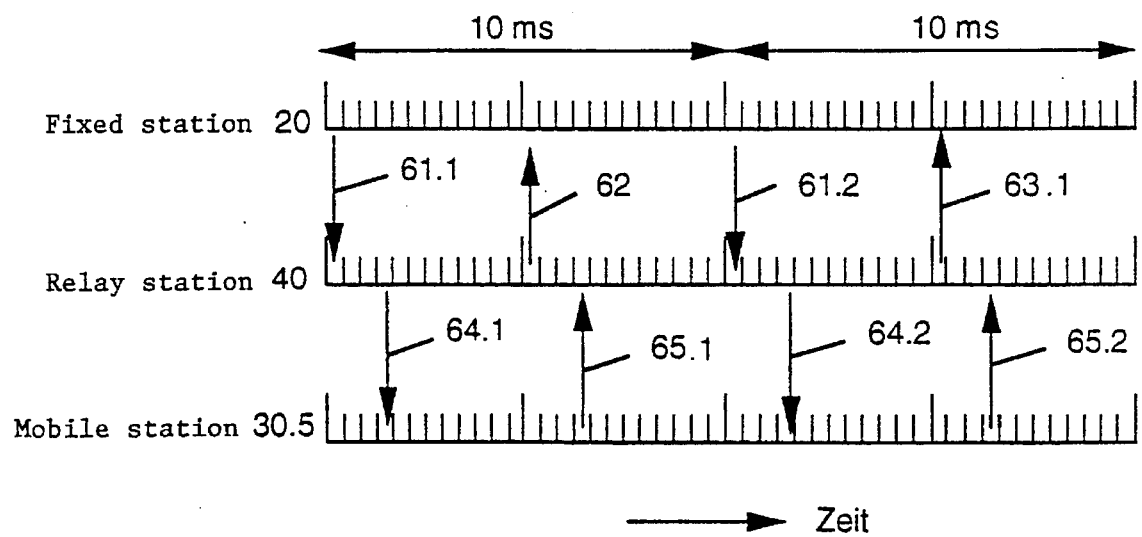
FIG. 3 is a diagram to explain the device in accordance with the invention.

As an example for clearer explanation of what has been said in the previous paragraph, FIG. 3 shows an arrow 61.1 on the left side, which symbolizes a connection package from the fixed station 20 to the relay station 40 in the first time slot S1 of the first period length. A (dashed) arrow 62 for the opposite direction in the thirteenth time slot should actually be associated with this arrow 61.1. Because of the described chronological sequence, the connecting package indicated by the dashed arrow 62 can only be transmitted in the next period length, i.e. delayed by one period length (arrow 63.1). Chronologically prior to this, i.e. in the selected example in the fourth time slot S4 of the first period length, the arrow 64.1 indicates a connection package from the relay station 40 to the mobile station 30.5, whose contents correspond to the package in accordance with the arrow 61.1. For the opposite direction, the arrow 65.1 in the sixteenth time slot E4 of the first period length corresponds to this connection package 64.1. Thus, for the one transmission direction the time slots S1 and S4 of the first period length are sequentially used, and for the other transmission direction sequentially the time slots E4 of the first period length and E1 of the second period length. The time delays occurring in this connection, i.e. for the one channel symbolized by the arrows 61.1 and 63.1, are effected and controlled by the relay station 40. The package transmissions, represented by the arrows 61.2, 64.2 and 65.2 in the second period length, are repeated in each period length. The arrow 63.2 falls into the third period length and therefore is no longer represented.

Figure 4:
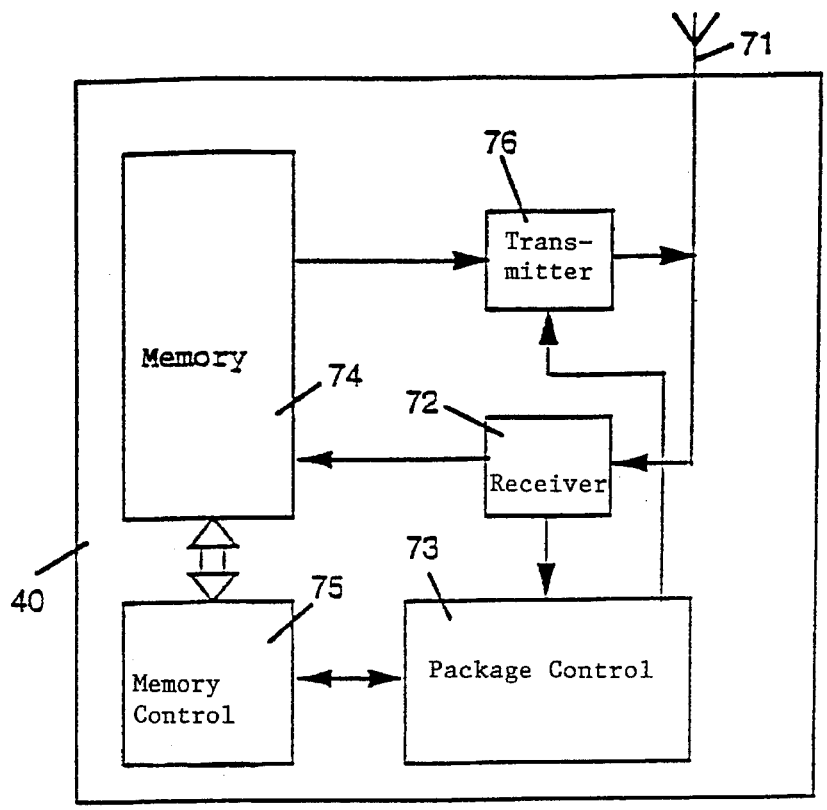
FIG. 4 is a block diagram of a relay station.

FIG. 4 shows a block diagram of the relay station 40. It comprises a single antenna 70 as a connecting link to the outside, i.e. the fixed station 20 and the mobile stations 30.5, 30.6. It maintains via this antenna respectively two coupled channels between the said stations 20, 30.5, 30.6 in the above described manner.

The relay station 40 furthermore comprises a receiver unit 72, a package control unit 73, a package memory 74 with an associated memory control 75 and a transmitter unit 76. The packages 50 arriving at different transmission frequencies via the antenna 70 are received by the receiver unit 72 and synchronized and read by the package control unit 73 regarding their character 52 and control data 53. Next, controlled by the memory control 75 the packages are read into the package memory 74 for intermediate storage and at the proper time read out again for the transmitter unit 76. The transmitter unit then causes the transmission via the antenna 70. In accordance with the function this means a paired combination of the above mentioned channels between the fixed station 20 and the relay station 40 as well as the channels between the relay station 40 and the mobile stations 30.5, 30.6 in the second functional area 23.

The further structure and mode of operation of the package control unit 73, the memory control 75 and the package memory 74 are such that each package 50 is stored for as short a time as possible and exactly assigned to the intended time slot. Controlled by the package control unit 73, the transmitter unit 76 selects the respectively correct transmission frequency for each departing package 50. Which time slots and which transmission frequencies are respectively selected as the channel is the result of the known method of the connection structure in accordance with the DECT Standards, which is not being addressed here.

Any write/read memory can be used in principle as the package memory 74, and advantageously a common processor control is used as the memory control 75 and package control unit 73.

Instead of operating in accordance with the exact DECT Standards, the described device can also operate in accordance with a more or less modified time multiplex method. Instead of redefining the channels from case to case, it is for example possible to provide fixed channels for the connection between the fixed station 20 and the relay station 40.

As indicated, the relay station 40 constitutes an independent unit, which normally requires only one net or power supply connection, but not a cable-connected connection with the telecommunications net. This simplifies installation. It is also possible to provide battery operation in place of a power supply connection, which further simplifies the installation.

Figure 5:
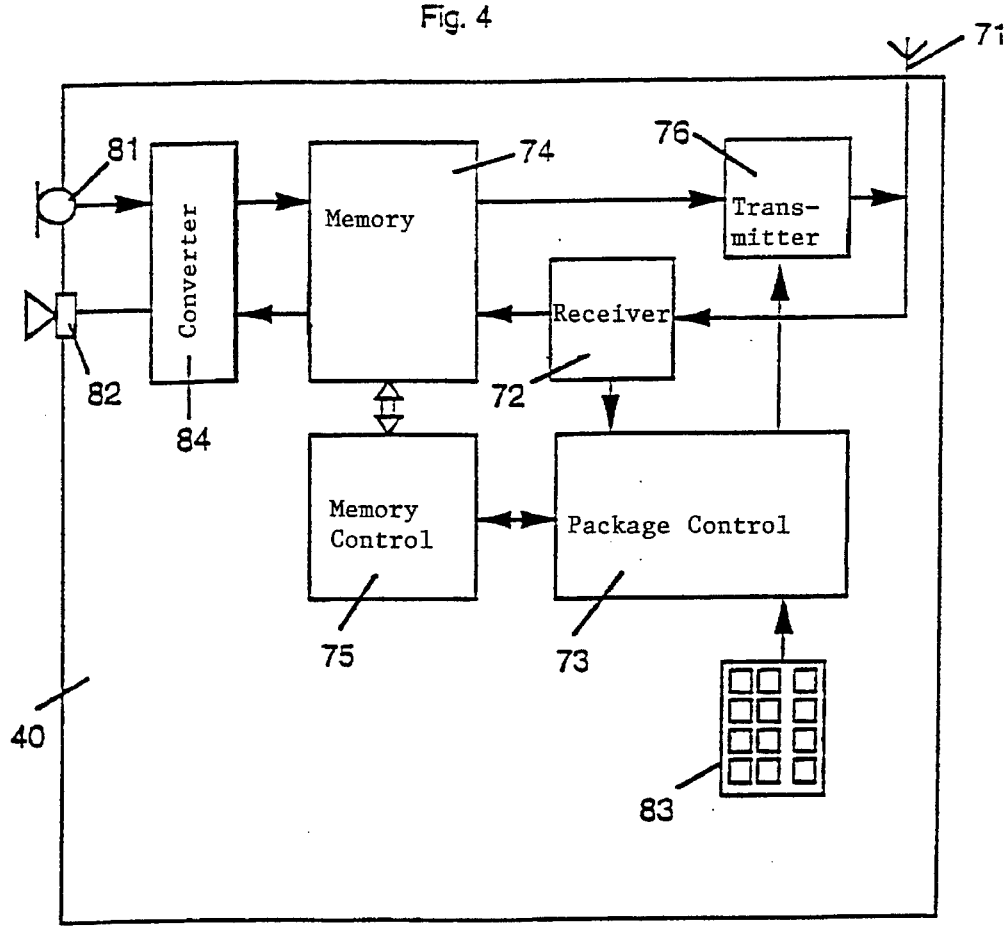
FIG. 5 is a further block diagram of a relay station.

FIG. 5 shows a variant of the block diagram of FIG. 4. As described, this variant comprises units 71 to 76 with unchanged functions. Added to this is a microphone or telephone transmitter 81, a loudspeaker or telephone receiver 82, a dial keyboard 83 and a converter 84. These additional units are used to provide the relay station 40 also with the functions of a mobile station 30 in addition to its described relay functions. In this connection the package control unit 73 continues to differentiate whether an incoming package 50 is destined for internal use or, as described above, is to be transmitted again for external use after intermediate storage. If the package 50 has been recognized as "internal", it is forwarded to the converter 84 via the memory 74. The converter digitally/analogously converts the contained voice data and forwards the result as a voice signal to the telephone receiver 82.

In the other direction, voice segments being created in the telephone transmitter 81 are digitized by the converter 84 and assigned to a package 50. This is transmitted via the memory 74, the transmitter unit 76 and the antenna 71. The keyboard 83 is used in the conventional manner to trigger known dial processes manually.

The device in accordance with FIG. 5 can be used as a mobile relay station 40 and/or as a mobile station 30. In its expense it is comparable to every one of these stations and therefore represents a cost-effective option for realization.

The first and the second functional areas 22 and 23 can be arranged next to each other without overlap. However, as represented in FIG. 1, the areas can also overlap. In this case it can be decided, for example on the basis of defined receiving strengths, whether a channel is to be installed directly or with the inclusion of the relay station 40.

It is of course possible to associate two or more relay stations 40 with one fixed station 20 in place of a single relay station 40, which serve independent localities which are located outside of the normal range between the fixed station 20 and the mobile stations 30, i.e. outside of the first functional area 22. Furthermore it is in principle possible to switch two or more relay stations 40 in series to bridge a longer distance. However, the latter has two important disadvantages. The first of these disadvantages lies in that additional channels are blocked by this which, in accordance with the DECT Standards, actually should be available for separate connections. The other disadvantage results because of further delays in the additional relay stations 40. This can cause greatly reduced transmission qualities, in particular because of interfering, chronologically stacked echoes of the words of the speaker and those coming from his party.

What is claimed is:

1. A device for increasing the functional area of a system of digitally operating cordless telephones with a fixed station and with portable mobile stations associated with said fixed station, wherein said fixed station and active ones of the mobile stations are connected via channels realized by means of time-multiplexing packages and several selectable transmitting frequencies in accordance with DECT Standards, wherein at least one relay station is disposed at the edge of an area which corresponds to the actual functional area of the system, and wherein each relay station includes a single antenna, a receiver unit succeeding the antenna and a package control unit for receiving and evaluating incoming packages arriving at said antenna, a package memory with an associated memory control for the controlled intermediate storage of all said incoming packages and further comprising a transmitter unit connected to the antenna for the successive, controlled retransmission of the packages stored in said memory.

2. A device in accordance with claim 1, wherein a single relay station is provided.

3. A device in accordance with claim 1, wherein two or more relay stations are provided, which operate parallel in respect to each other and are assigned to different localities.

4. A device in accordance with claim 1, wherein said relay station has an additional function provided by additionally providing a microphone capsule, a receiver capsule, a dial keyboard and a converter connected with the package memory, because of which units the relay station has the additional function of a mobile station.

5. A method for operating a device for increasing the functional area of a system of digitally operating cordless telephones with a fixed station and with portable mobile stations associated with this fixed station and with at least one relay station in accordance with claim 1, wherein each relay station maintains respectively one channel with the fixed station and a channel with those mobile stations which are located in the range of the relay station and outside of the area which corresponds to the actual functional area of the system, wherein these channels for connecting the fixed station with the said mobile stations are combined in pairs by the relay station, wherein the relay station supervises all said packages arriving on said channels and retransmits them in a controlled manner in such a way that in each channel pair the respective chronological sequence of the packages corresponds to the information flow and only a minimum time delay occurs, wherein a channel, in accordance with the DETC Standards, consists of the combination of two time slots associated with each other and one or two of several transmission frequencies, wherein all channels are different from each other, and wherein each said time slot is occupied only once.

6. A method in accordance with claim 5, wherein the channels are set up and taken down as conditions demand.

7. A method in accordance with claim 5, wherein channels are fixedly established between the relay stations and the fixed station.

\* \* \* \* \*